US007827326B2

(12) United States Patent
Bosch et al.

(10) Patent No.: US 7,827,326 B2
(45) Date of Patent: Nov. 2, 2010

(54) METHOD AND APPARATUS FOR DELEGATION OF SECURE OPERATING MODE ACCESS PRIVILEGE FROM PROCESSOR TO PERIPHERAL

(75) Inventors: Peter Bosch, New Providence, NJ (US); Hubert Rae McLellan, Jr., Summit, NJ (US); Sape Jurriën Mullender, North Plainfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 206 days.

(21) Appl. No.: 11/944,916

(22) Filed: Nov. 26, 2007

(65) Prior Publication Data

US 2009/0138623 A1    May 28, 2009

(51) Int. Cl.
G06F 3/00 (2006.01)
G06F 5/00 (2006.01)
(52) U.S. Cl. .................. 710/36; 713/164; 713/167; 726/27
(58) Field of Classification Search .................. 710/14, 710/36; 726/1, 17, 21
See application file for complete search history.

(56) References Cited

U.S. PATENT DOCUMENTS 6,226,749 B1 * 5/2001 Carloganu et al. .............. 726/2
6,317,838 B1 * 11/2001 Baize .......................... 726/11
6,934,187 B2 * 8/2005 Cheung .................. 365/185.18
2006/0015947 A1 * 1/2006 Conti et al. .................... 726/34
2006/0129710 A1 * 6/2006 O'Connor et al. ............. 710/36
2006/0143687 A1 * 6/2006 O'Connor et al. .............. 726/1
2006/0149917 A1 * 7/2006 O'Connor et al. ........... 711/173
2006/0179179 A1 * 8/2006 Suzuoki ....................... 710/22
2007/0234020 A1 * 10/2007 Jensen ........................ 712/244
2008/0222663 A1 * 9/2008 Carpenter et al. ........... 719/328

FOREIGN PATENT DOCUMENTS

EP       1801700       6/2007
WO    WO2005/119961    12/2005
WO  PCT/US2008/012699   3/2009

OTHER PUBLICATIONS

ARM, TrustZone® Technology, www.arm.com, Jun. 2006, 4 pages.

* cited by examiner

*Primary Examiner*—Henry W Tsai
*Assistant Examiner*—Elias Mamo
(74) *Attorney, Agent, or Firm*—Ryan, Mason & Lewis, LLP

(57) ABSTRACT

In a processing system comprising a processor and a plurality of peripherals coupled to the processor, access privileges of a secure operating mode of the processor are delegated to at least a given one of the peripherals. The given peripheral is configured to store, in a secure portion of that peripheral, state information indicative of the processor being in a secure operating mode. The given peripheral is further configured to utilize the stored state information to allow the given peripheral to access at least one resource that is accessible to the processor in the secure operating mode but is not otherwise accessible to the given peripheral. The processing system may comprise, for example, a system on a chip, wherein the processor and peripherals are combined into a single integrated circuit.

19 Claims, 2 Drawing Sheets

METHOD AND APPARATUS FOR DELEGATION OF SECURE OPERATING MODE ACCESS PRIVILEGE FROM PROCESSOR TO PERIPHERAL

FIELD OF THE INVENTION

The present invention relates generally to processing systems and more particularly to techniques for providing security against unauthorized access to peripherals and other resources within such systems.

BACKGROUND OF THE INVENTION

A computer or other processing system generally comprises a processor and a number of peripherals. The processor and its associated peripherals may be discrete system components, or may be combined into a single integrated circuit. The latter type of arrangement is also referred to as a system on a chip (SOC). The peripherals may be implemented, by way of example, as dedicated pieces of hardware that are configured to perform specified tasks at the request of the processor. These peripherals are typically controlled by software running on the processor. Particular portions of this software, referred to herein as software agents, write configuration information to the peripherals specifying details of the requested tasks.

Certain processor architectures allow the processor to operate in a secure mode. When operating in the secure mode, the processor is generally able to access all peripherals or other system resources without restriction. The secure operating mode is typically reserved for use by a limited set of high privilege software agents that run on the processor and have been previously verified and proven trustworthy and correct. Low privilege or unprivileged software agents are also permitted to run on the processor, but cannot use the secure operating mode. These unverified software agents are instead run in a non-secure mode. Limiting the use of the secure operating mode to a small subset of the software agents reduces the costs associated with software program code verification, while also ensuring that unverified software agents cannot undermine the security of the overall system.

A problem that arises in conventional processing systems of the type described above is that system elements other than the processor often have access to secure information within the processing system. For example, peripherals may obtain access to secure information in the course of performing various tasks at the request of the processor, such as tasks associated with direct memory access (DMA), encryption and interrupt control. Although the processor that requested performance of the tasks may itself be operating in a secure mode, the corresponding peripherals may not have a secure operating mode. As a result, the security of the system may be vulnerable to attack through non-secure software agents that have access to the same peripherals that perform tasks for secure software agents.

SUMMARY OF THE INVENTION

Illustrative embodiments of the present invention provide enhanced security in a processing system that includes a processor and a number of associated peripherals, by providing a mechanism for delegation of access privileges of a secure operating mode from the processor to one or more of the peripherals.

In accordance with one aspect of the invention, at least a given one of the peripherals is configured to store, in a secure portion of that peripheral, state information indicative of the processor being in a secure operating mode. The given peripheral is further configured to utilize the stored state information to allow the given peripheral to access at least one resource that is accessible to the processor in the secure operating mode but is not otherwise accessible to the given peripheral.

In an illustrative embodiment, the processor conveys the privilege level of its current operating mode to the peripheral in conjunction with a bus transaction carried out between the processor and the peripheral. The peripheral utilizes the conveyed privilege level to access a given resource in conjunction with a bus transaction carried out between the peripheral and the given resource. The given resource may comprise, for example, another one of the peripherals of the processing system. The stored state information indicative of the privilege level of the peripheral as delegated by the processor generally cannot be modified by a software agent running in a non-secure operating mode of the processor. However, the stored state information indicative of delegated privilege level may be cleared upon completion of a corresponding task, where the task is performed by the peripheral at the request of a secure software agent running on the processor in the secure operating mode.

The illustrative embodiments allow the access privileges of secure processor operating modes to be delegated to peripherals in a controlled manner, thereby eliminating additional security risks that could otherwise arise in the processing system. The delegated access privileges are retained by the peripherals in the form of secure state information that cannot be altered by non-secure software agents. Moreover, a given peripheral can utilize the stored state information to access other system resources that it would not otherwise be able to access absent the delegated access privileges of the processor.

DETAILED DESCRIPTION OF THE INVENTION

The invention will be described herein in conjunction with illustrative embodiments of processing systems and associated access privilege delegation techniques. It should be understood, however, that the invention is not limited to use with the particular processing systems and techniques described, but is instead more generally applicable to any type of processing system application in which it is desirable to provide enhanced security for peripherals of that system.

Figure 1:
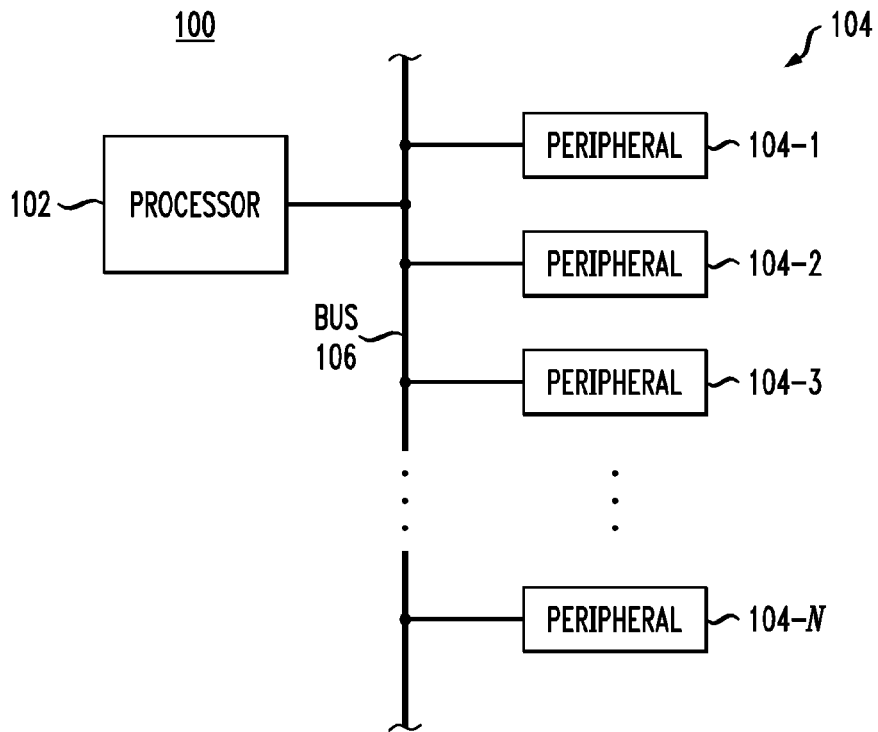
FIG. 1 shows an illustrative embodiment of a processing system in which the present invention is implemented.

FIG. 1 shows an illustrative embodiment of a processing system 100. The system 100 may be representative of, for example, a computer or SOC, and includes a processor 102 which communicates with peripherals 104-1, 104-2, . . . 104-N over a bus 106. The particular number N of peripherals is arbitrary and will vary from system to system. The peripherals may be, for example, dedicated pieces of hardware that are configured by software agents running on the processor to perform particular requested tasks. In this embodiment, one or more of the peripherals may comprise, for example, an encryption engine, a DMA engine, or an interrupt controller, as will be described in greater detail below. It is also possible that one or more of the peripherals 104 may each comprise an internal processor, such that the peripheral is also able to execute software programs comprising one or more software agents.

Although only a single separate processor is shown in FIG. 1, other embodiments may include multiple such processors, each of which is coupled to the bus 106 and communicates with at least a subset of the peripherals 104.

The processing system 100 may further include other elements not explicitly shown in the figure, but commonly included in conventional implementations of computers, SOCs or other processing systems. Such conventional elements, being well understood by those skilled in the art, will not be described in detail herein.

At least one of the peripherals 104 of the system 100 is configured to receive a delegated access privilege from the processor 102. This peripheral generally comprises secure memory for storing state information indicative of the processor being in a secure operating mode, and processing circuitry that utilizes the stored state information to allow the peripheral to access at least one resource that is accessible to the processor in the secure operating mode but is not otherwise accessible to the peripheral. The resource that is accessed using the delegated access privilege may comprise, for example, another one of the peripherals 104, or more generally any other access-controlled resource of the system 100.

Figure 2:
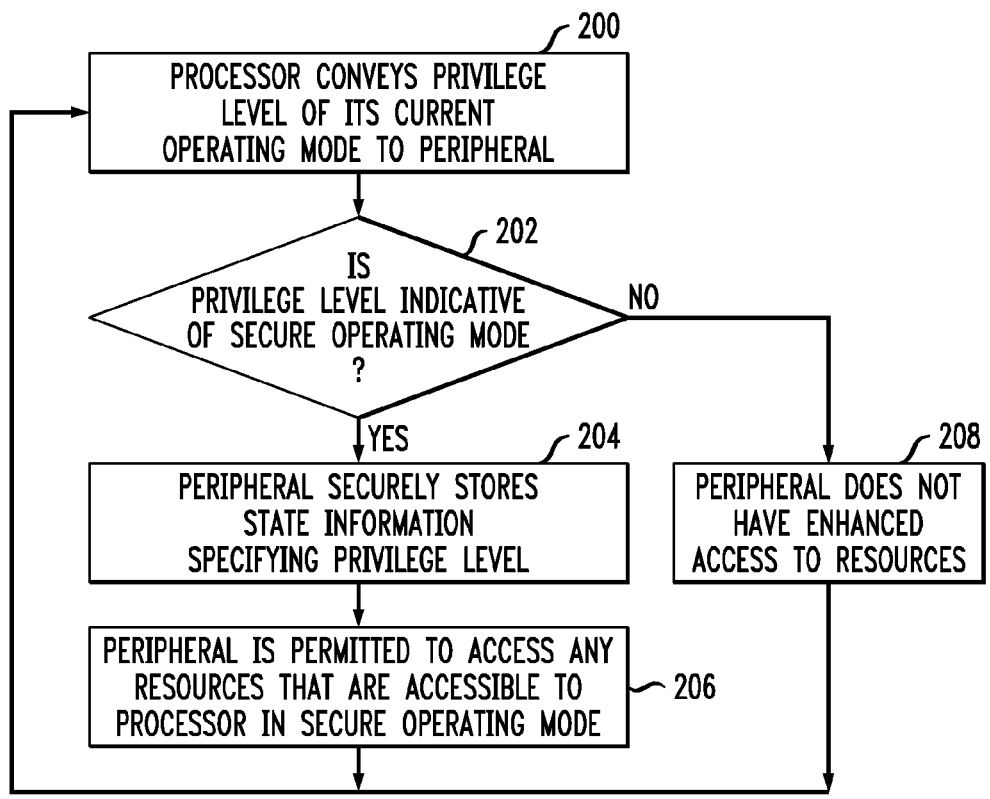
FIG. 2 is a flow diagram of a process for delegating access privileges of a secure operating mode from a processor to a peripheral in the FIG. 1 system.

FIG. 2 shows one embodiment of a process for delegating access privileges of a secure operating mode from processor 102 to a given peripheral 104-$i$, i=1, 2, . . . N, in the FIG. 1 system. The process in this embodiment includes steps 200 through 208.

In step 200, the processor 200 conveys the privilege level of its current operating mode to the peripheral 104-$i$. The processor may convey the privilege level of its current operating mode to the peripheral in conjunction with an otherwise conventional bus transaction carried out over bus 106 between the processor and the peripheral. A given such bus transaction can be modified in a straightforward manner to allow information indicative of the current operating mode of the processor to be conveyed to the peripheral. This information need not take any particular format, but instead need only be capable of reliably and securely indicating the processor operating mode.

By way of example, single-bit or multi-bit indicators may be used. In the present embodiment, the information is indicative of which of a number of possible operating modes the processor is currently in. For example, the processor may operate in two different modes, a secure mode and a non-secure mode. Thus, certain of the bus transactions are carried out in one mode and other bus transactions in the other mode. However, the invention is not limited to any particular number or type of operating modes.

In step 202, the peripheral 104-$i$ determines if the conveyed privilege level is indicative of the secure operating mode of the processor 102. This determination in the present embodiment is based on interpretation of the information conveyed by the processor that indicates the privilege level of its current operating mode. Thus, the determination could involve determining which of two or more operating modes the processor is currently in, based on the conveyed privilege level, with a first possible privilege level being indicative of the secure operating mode and a second possible privilege level being indicative of the non-secure operating mode. There may be multiple privilege levels associated with each of a number of different operating modes. For example, a given secure operating mode may have two or more different privilege levels associated therewith.

If the peripheral 104-$i$ determines in step 202 that the processor is currently in the secure operating mode, the process moves to step 204. Otherwise, the process moves to step 208, bypassing steps 204 and 206. The determination in step 202 may be based on predetermined knowledge of particular privilege levels associated with various operating modes of the processor 102, or alternatively may be based on interpretation of an operating mode identifier or other information conveyed by the processor. Any such conveyed information from which the presence or absence of a secure operating mode may be determined is considered to be within the broad scope of the term "privilege level" as used herein. Thus, the conveyed privilege level may comprise, for example, an indicator of one of a number of privilege levels known to be associated with a secure operating mode of the processor, or an explicit identifier of a secure operating mode of the processor.

In step 204, the peripheral 104-$i$ securely stores state information specifying the privilege level of the secure operating mode of the processor 102. The stored state information is generally indicative of the processor being in its secure operating mode. This secure storage of state information generally involves storing such information in a secure portion of the peripheral. For example, the peripheral may be partitioned into secure and non-secure portions, also referred to herein as private and public portions, respectively, with the state information being stored in the secure or private portion of the peripheral. Such secure or private portions may comprise, for example, encrypted or otherwise access-controlled portions of a memory or other component of the peripheral.

In step 206, the peripheral 104-$i$ utilizes the stored state information to access at least one resource that is accessible to the processor 102 in the secure operating mode but is not otherwise accessible to the peripheral. The resource may be, for example, another one of the peripherals 104 of the system 100, or any other access-controlled resource of the system. The peripheral 104-$i$ is thus permitted to access any peripherals or other resources that are accessible to the processor 102 in its secure operating mode. The peripheral may access a given resource by supplying the stored state information or a portion thereof to the given resource in order to obtain access to that resource. As one alternative, the peripheral may process the stored state information in order to derive other information that is supplied to the given resource in order to obtain access thereto. In an embodiment in which the accessed resource comprises another one of the peripherals 104 of the system 100, the peripheral 104-$i$ may utilize the stored state information to access the other peripheral in conjunction with a bus transaction carried out between the two peripherals.

In step 208, the peripheral 104-$i$ does not have enhanced access to resources. Thus, for example, the peripheral is only able to access those peripherals or other resources that it would normally be able to access in the absence of any delegation of access privileges from the processor 102. Accordingly, step 208 may involve one or more other peripherals or resources denying access attempts by the peripheral 104-$i$ or the peripheral 104-$i$ refraining from making such access attempts knowing that it has insufficient access privilege.

The process after completion of step 206 or step 208 for one or more resource accesses returns to step 200 in order to allow the processor 102 to convey any changes in its current operating mode. Such changes in operating mode may arise, for example, as different software agents running on the processor request the performance of tasks by the peripheral 104-*i*. As indicated previously herein, certain software agents running on a processor may be secure agents that execute in the secure operating mode of the processor, while others are non-secure software agents that execute in a non-secure operating mode of the processor. Thus, the operating mode of the processor will typically change depending upon which type of software agents are currently executing, and may change, for example, from bus transaction to bus transaction. The process steps 200 through 206 or 200, 202 and 208 may thus be repeated for different bus transactions, depending on the operating mode of the processor when conducting such transactions.

The process as illustrated in FIG. 2 for a particular peripheral 104-*i* can be repeated for other peripherals 104 of the system 100. For example, the processor 102 can delegate secure operating mode access privileges to two or more of the peripherals, such that multiple peripherals simultaneously have the delegated access privileges.

It is to be appreciated that the particular process steps shown in FIG. 2 are not requirements of the invention, and alternative embodiments may utilize other operations for delegating access privileges of a processor secure operating mode to a peripheral.

Figure 3:
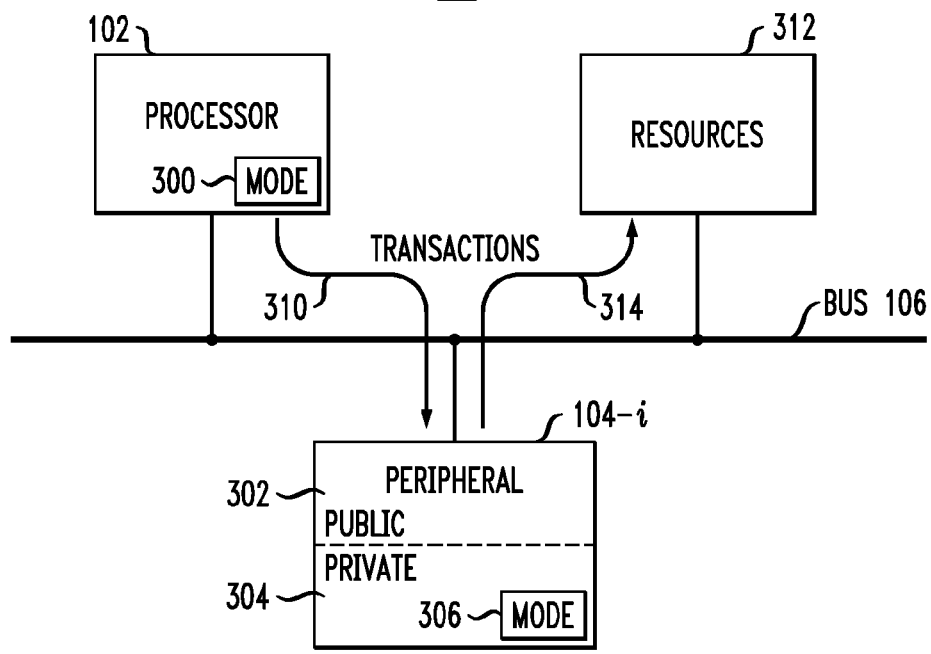
FIG. 3 is a diagram illustrating one possible implementation of the FIG. 2 process in the FIG. 1 system.

FIG. 3 shows one possible implementation of the FIG. 2 process in the system 100 of FIG. 1. In this embodiment, processor 102 again communicates with a particular one of the peripherals 104 over the bus 106. As previously, the particular peripheral is denoted 104-*i*, and may represent any one of the N peripherals of the system 100.

The processor 102 in this embodiment stores state information 300 indicative of its current operating mode. It will be assumed for this embodiment that the processor is currently operating in its secure operating mode, and thus the state information 300 is indicative of the secure operating mode. The peripheral 104-*i* is partitioned into public and private portions denoted 302 and 304, respectively, with the private or secure portion storing state information 306 indicative of the current operating mode of the processor 102. The storage of the state information 306 in peripheral 104-*i* is performed in conjunction with a bus transaction 310 carried out between the processor 102 and the peripheral 104-*i*. As described in conjunction with FIG. 2, the processor conveys the privilege level of its current operating mode to the peripheral 104-*i*, and the peripheral 104-*i* determines if that privilege level corresponds to a secure operating mode. If the peripheral 104-*i* determines that the conveyed privilege level indicates that the processor is currently operating in its secure operating mode, corresponding state information 306 is stored in the private or secure portion of the peripheral 104-*i*. Otherwise, such state information need not be stored.

The stored state information 306 is an example of a delegated access privilege that the peripheral 104-*i* receives from the processor 102. This delegated access privilege allows the peripheral 104-*i* to access resources that it would not otherwise be able to access. The peripheral 104-*i* is thus able to share, for a limited time and under other conditions controlled by the processor, the access privileges of the secure operating mode of the processor.

The peripheral 104-*i* utilizes the stored state information 306 to access one or more other resources 312 in conjunction with one or more other bus transactions 314. As mentioned above, these other resources 312 may comprise one or more of the other peripherals 104 of the system 100.

Figure 4:
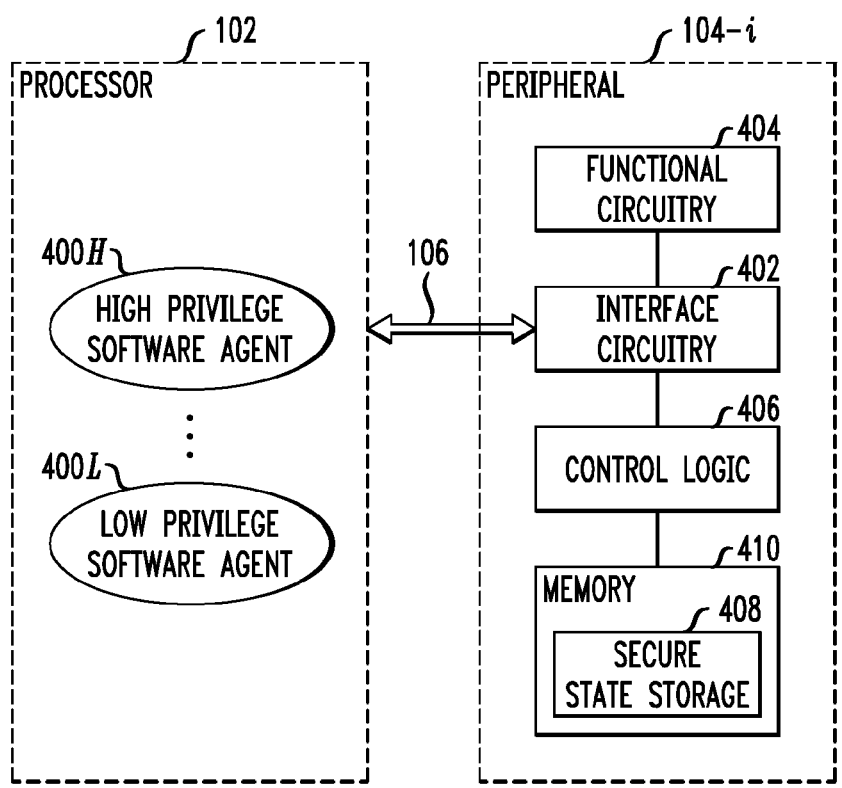
FIG. 4 is a more detailed view of one possible implementation of processor and peripheral elements of the FIG. 1 system.

FIG. 4 shows additional details associated with one possible implementation of processor 102 and a given peripheral 104-*i*. In this example, the processor 102 is shown as comprising a plurality of software agents 400, including a high privilege software agent 400H and a low privilege software agent 400L. The software agents 400H and 400L may be viewed as examples of what are more generally referred to herein as secure and non-secure software agents, respectively. There may be multiple other levels of privilege supported within a given processor, and the present invention is not restricted in this regard. The processor 102 is coupled via bus 106 to interface circuitry 402 of the peripheral 104-*i*. This interface circuitry is coupled to functional circuitry 404, which is conventional circuitry configured to perform whatever functions are associated with the peripheral in question. For example, if the peripheral is an encryption engine, functional circuitry 404 may comprise a cryptographic processor for encrypting data. Similarly, if the peripheral is a DMA engine, the functional circuitry 404 may comprise conventional DMA circuitry.

It should be noted that the functional circuitry 404 may itself include a processor. Thus, the peripheral 104-*i* could be an intelligent peripheral that includes software execution functionality via its own internal processor.

Also included in the peripheral 104-*i* is control logic 406 and secure state storage 408 within a memory 410. The control logic 406 is configured to process privilege level information received from processor 102 via the interface circuitry 402. This processing includes determining if the privilege level is indicative of a secure operating mode, and controlling secure storage of corresponding state information in element 408 of memory 410. The control logic 406 may also be configured to perform processing operations associated with allowing the peripheral 104-*i* to access other resources based on the stored state information.

The particular circuitry arrangement of peripheral 104-*i* as shown in FIG. 4 should be viewed as just one illustrative example of such a peripheral. It is to be understood that the invention can be implemented using other types and configurations of peripherals, using a wide variety of different hardware, software and firmware components. For example, it was noted above that the functional circuitry 404 of the peripheral 104-*i* may comprise an internal processor, and the stored state information could be stored in a secure portion of a memory within this internal processor, instead of in a separate memory as in the illustrative arrangement shown in FIG. 4.

A number of examples will now be described to illustrate the manner in which access privilege of a secure operating mode can be delegated from processor 102 to a particular peripheral 104-*i* in the system 100 of FIG. 1. The three examples to be described relate to three different types of peripherals 104, namely, an encryption engine, a DMA engine, and an interrupt controller. It is to be appreciated, however, that the disclosed techniques are applicable to a wide variety of other peripherals.

In the first example, the peripheral 104-*i* comprises an encryption engine. Such a peripheral may be used by the system 100 to encrypt information that it wants to keep private from non-secure software agents. The encryption engine may be made secure in the present embodiment by providing it with a capability to receive delegated access privileges from the processor 102. Thus, when the processor 102 is operating in a secure mode, the corresponding state information is securely stored in the encryption engine as previously described. The encryption engine may utilize this securely stored state information to prevent any non-secure software agents from configuring the encryption engine or accessing sensitive information such as encryption keys. Once the encryption engine has completed a task requested by a secure software agent, the previously-stored state information may be cleared, such that the encryption engine can then be accessed by secure or non-secure software agents. Generally, the encryption engine stores state information indicative of the processor being in its secure operating mode, and for the duration of the corresponding requested task the encryption engine cannot be accessed by non-secure software agents.

In the second example, the peripheral 104-*i* comprises a DMA engine. Such an engine is designed to move data to and from memory. A software agent running on the processor configures the source and destination memory addresses and then allows the DMA engine to transfer the data without further processor intervention. Such DMA transfers may be from one memory to another memory, or between one memory and other peripherals. Using the techniques disclosed herein, the DMA engine may be configured to securely store state information indicative of the privilege level of the software agent configuring the DMA operation. This allows DMA transfers to access protected memory resources only when the DMA engine was configured by a secure software agent. It also prevents non-secure software agents from determining the source and destination addresses used by the DMA engine once it has been configured in the secure state. Otherwise, non-secure agents could learn the memory addresses where secure data is stored.

Finally, in the third example the peripheral 104-*i* comprises an interrupt controller that utilizes the stored state information to configure interrupts as either secure or non-secure. Once an interrupt is configured as secure, it cannot be modified by software agents running at less than a secure privilege level. Also, only secure interrupts are able to vector the processor into secure modes of operation. This ensures that a non-secure agent will not be able to configure the interrupt controller to generate an interrupt that will vector the processor from a non-secure operating mode to a secure operating mode.

The illustrative embodiments described above allow a peripheral to store state information that is indicative of the privilege level of the processor software agent that configured that peripheral. This state information is stored in a secure manner and thus cannot be altered by non-secure software agents. Moreover, the peripheral can utilize the stored state information to access other system resources that it would not otherwise be able to access absent the delegated access privileges of the processor.

These illustrative arrangements considerably improve the security of processing systems that include multiple peripherals and one or more processors that execute software agents in both secure and non-secure modes of operation. The access privileges of the secure processor operating modes are delegated to the peripherals in a controlled manner, thereby eliminating additional security risks that could otherwise arise within such systems.

It should again be emphasized that the above-described embodiments are intended to be illustrative only. For example, the processing system configuration and access privilege delegation process can be altered in other embodiments. As another example, the particular number and type of privilege levels may be varied to accommodate the needs of a given application. Also, the particular manner in which the peripheral determines if the processor is in a secure operating mode, stores corresponding state information, and utilizes that stored state information to allow the peripheral to access protected resources, can be varied in alternative embodiments. These and numerous other alternative embodiments within the scope of the following claims will be readily apparent to those skilled in the art.

We claim:

1. A method of delegating an access privilege from a processor to a peripheral in a processing system, the method comprising the steps of:
   storing in a secure portion of the peripheral state information indicative of the processor being in a secure operating mode;
   utilizing the stored state information to allow the peripheral to access at least one resource that is accessible to the processor in the secure operating mode but is not otherwise accessible to the peripheral; and
   clearing the stored state information upon completion of a corresponding task wherein the task is performed by the peripheral at the request of a secure software agent running on the processor in the secure operating mode;
   wherein the stored state information comprises the access privilege delegated from the processor to the peripheral and allows the peripheral to access said at least one resource that it would not otherwise be able to access absent the delegated access privilege, thereby permitting the peripheral to share, under conditions controlled by the processor, the access privilege of the processor.

2. The method of claim 1 wherein the processor conveys the privilege level of its current operating mode to the peripheral.

3. The method of claim 2 wherein the peripheral determines if the privilege level is indicative of the secure operating mode and if so executes the storing step.

4. The method of claim 1 wherein the utilizing step further comprises the peripheral supplying the stored state information to a given resource in order to obtain access to that resource.

5. The method of claim 4 wherein the given resource comprises another peripheral of the processing system.

6. The method of claim 2 wherein the processor conveys the privilege level of its current operating mode to the peripheral in conjunction with a bus transaction carried out between the processor and the peripheral.

7. The method of claim 6 wherein the peripheral utilizes the stored state information to access a given resource in conjunction with a bus transaction carried out between the peripheral and the given resource.

8. The method of claim 1 wherein the stored state information cannot be modified by a software agent running in a non-secure operating mode of the processor.

9. The method of claim 1 wherein the task comprises at least one of an encryption operation, a direct memory access transfer operation and an interrupt generation operation.

10. The method of claim 1 wherein after the stored state information is cleared the peripheral is able to perform a task at the request of a non-secure software agent running on the processor in a non-secure operating mode.

11. A machine-readable non-transitory storage medium having encoded therein machine-executable instructions that when executed implement the steps of the method of claim 1.

12. An apparatus comprising:
    a peripheral configured to receive a delegated access privilege from a processor, the peripheral comprising:
      secure memory for storing state information indicative of the processor being in a secure operating mode; and
      processing circuitry coupled to the secure memory and adapted to utilize the stored state information to allow the peripheral to access at least one resource that is accessible to the processor in the secure operating mode but is not otherwise accessible to the peripheral and further adapted to clear the stored state information upon completion of a corresponding task wherein the task is performed by the peripheral at the request of a secure software agent running on the processor in the secure operating mode;

wherein the stored state information comprises the access privilege delegated from the processor to the peripheral and allows the peripheral to access said at least one resource that it would not otherwise be able to access absent the delegated access privilege, thereby permitting the peripheral to share, under conditions controlled by the processor, the access privilege of the processor.

13. The apparatus of claim 12 wherein the peripheral comprises an encryption engine.

14. The apparatus of claim 12 wherein the peripheral comprises a direct memory access engine.

15. The apparatus of claim 12 wherein the peripheral comprises an interrupt controller.

16. The apparatus of claim 12 wherein the peripheral is integrated with the processor into a single integrated circuit.

17. A processing system comprising:
a processor; and
a plurality of peripherals coupled to the processor;
wherein at least a given one of the peripherals is configured to store in a secure portion of that peripheral state information indicative of the processor being in a secure operating mode, to utilize the stored state information to allow the given peripheral to access at least one resource that is accessible to the processor in the secure operating mode but is not otherwise accessible to the given peripheral, and to clear the stored state information upon completion of a corresponding task wherein the task is performed by the given peripheral at the request of a secure software agent running on the processor in the secure operating mode; and wherein the stored state information comprises an access privilege delegated from the processor to the peripheral that allows the peripheral to access said at least one resource that it would not otherwise be able to access absent the delegated access privilege, thereby permitting the peripheral to share, under conditions controlled by the processor, the access privilege of the processor.

18. The system of claim 17 wherein the processing system comprises a system on a chip in which the processor and one or more of the peripherals are combined into a single integrated circuit.

19. The system of claim 17 wherein the given peripheral utilizes the stored state information to access another one of the peripherals in conjunction with a bus transaction carried out between the given peripheral and the other peripheral.

* * * * *